(12) United States Patent
Park et al.

(10) Patent No.: US 12,315,099 B2
(45) Date of Patent: May 27, 2025

(54) METHOD AND APPARATUS FOR DISPLAYING TRANSLUCENT IMAGE

(71) Applicant: MEDICALIP CO., LTD., Gangwon-do (KR)

(72) Inventors: Sang Joon Park, Seoul (KR); Chul Kee Park, Seoul (KR); Yun Sik Dho, Seoul (KR); Byeong Cheol Lee, Seoul (KR)

(73) Assignee: MEDICALIP CO., LTD., Gangwon-do (KR)

( * ) Notice: Subject to any disclaimer, the term of this patent is extended or adjusted under 35 U.S.C. 154(b) by 177 days.

(21) Appl. No.: 18/173,739

(22) Filed: Feb. 23, 2023

(65) Prior Publication Data

US 2023/0274519 A1     Aug. 31, 2023

(30) Foreign Application Priority Data

Feb. 28, 2022   (KR) .................. 10-2022-0026306

(51) Int. Cl.
*G06T 19/20*     (2011.01)
*G06T 7/90*      (2017.01)

(52) U.S. Cl.
CPC ............... *G06T 19/20* (2013.01); *G06T 7/90* (2017.01); *G06T 2200/04* (2013.01); *G06T 2207/10024* (2013.01); *G06T 2210/62* (2013.01); *G06T 2219/2012* (2013.01)

(58) Field of Classification Search
CPC ....... G06T 19/20; G06T 7/90; G06T 2200/04; G06T 2207/10024; G06T 2210/62; G06T 2219/2012; G06T 15/08; G06T 15/503; H04N 13/39; H04N 13/15; H04N 13/156
See application file for complete search history.

(56) References Cited

U.S. PATENT DOCUMENTS

| | | | |
|---|---|---|---|
| 6,243,098 B1* | 6/2001 | Lauer ...................... | G06T 15/08 345/419 |
| 6,310,620 B1* | 10/2001 | Lauer .................... | G06T 15/405 345/620 |
| 2005/0017972 A1* | 1/2005 | Poole ..................... | A61B 8/461 345/424 |
| 2007/0206008 A1* | 9/2007 | Kaufman ................ | G06T 15/06 345/427 |
| 2008/0024493 A1 | 1/2008 | Bordoloi et al. | |
| 2008/0232694 A1* | 9/2008 | Sulatycke ............. | G06T 15/005 382/224 |

(Continued)

OTHER PUBLICATIONS

Jung, Y. (2018). Occlusion-based Direct vol. Rendering for Computed Tomography Image. Journal of Multimedia Information System, 5(1), 35-42.*

(Continued)

*Primary Examiner* — Sarah Lhymn
(74) *Attorney, Agent, or Firm* — JCIPRNET

(57) ABSTRACT

Provided are a method and apparatus for displaying a translucent image. An image display apparatus detects a plurality of voxels overlapping in a depth direction in three-dimensional (3D) image data, determines a first combination ratio for two colors based on transparency values of a first voxel and a second voxel, generates a first mixed color by combining a color of the first voxel with a color of the second voxel at the first combination ratio, and displays a mixed color on a screen.

10 Claims, 11 Drawing Sheets

(56) References Cited

U.S. PATENT DOCUMENTS

| | | | |
|---|---|---|---|
| 2010/0171740 A1* | 7/2010 | Andersen | G06T 7/11 715/848 |
| 2012/0087564 A1* | 4/2012 | Tsujita | A61B 8/5223 382/131 |
| 2013/0113802 A1* | 5/2013 | Weersink | A61N 5/1065 345/427 |
| 2017/0061681 A1* | 3/2017 | Engel | G06T 15/06 |
| 2020/0005520 A1* | 1/2020 | Zhang | G06T 15/06 |
| 2021/0304512 A1 | 9/2021 | Shirazian et al. | |

OTHER PUBLICATIONS

Jung, Y., Kim, J., Feng, D., & Fulham, M. (2016). Occlusion and slice-based volume rendering augmentation for PET-CT. IEEE journal of biomedical and health informatics, 21(4), 1005-1014.*

C.M. Wittenbrink et al., "Opacity-weighted color Interpolation for volume sampling", IEEE Symposium on Volume Visualization, Oct. 1998, pp. 1-8.

"Search Report of Europe Counterpart Application", issued on Jun. 30, 2023, p. 1-p. 9.

* cited by examiner

METHOD AND APPARATUS FOR DISPLAYING TRANSLUCENT IMAGE

CROSS-REFERENCE TO RELATED APPLICATIONS

This application is based on and claims priority under 35 U.S.C. § 119 to Korean Patent Application No. 10-2022-0026306, filed on Feb. 28, 2022, in the Korean Intellectual Property Office, the disclosure of which is incorporated by reference herein in its entirety.

BACKGROUND

1. Field

The disclosure relates to a method and apparatus for translucently displaying an object of a three-dimensional (3D) image.

2. Description of the Related Art

When a plurality of objects of a three-dimensional (ED) image are expressed in computer graphics, a user may adjust a transparency of each object to observe an inside or a back part of the object in a translucent state. When a 3D image is output on a screen including two-dimensional (2D) pixels, a sharpness, etc., of a translucent image varies depending on a pixel color, a transmittance, etc., of a region where several objects overlap translucently. For example, when a plurality of objects are displayed to overlap translucently, depending on a transmittance of each object, an object in front is visible well, whereas an object in the backmost side is not visible well, or vice versa. Alternatively, as several objects overlap translucently, a total transmittance decreases, such that each overlapping object may not be seen well.

SUMMARY

Provided are an image display method and apparatus in which a color, a transmittance, etc., of a translucent region may be optimally displayed to allow overlapping objects to be seen well when objects of a three-dimensional (3D) image are translucently displayed.

Additional aspects will be set forth in part in the description which follows and, in part, will be apparent from the description, or may be learned by practice of the presented embodiments of the disclosure.

According to an aspect of the disclosure, an image display method includes detecting a plurality of voxels overlapping in a depth direction in three-dimensional (3D) image data, determining a first combination ratio for two colors based on transparency values of a first voxel and a second voxel, generating a first mixed color by combining a color of the first voxel with a color of the second voxel at the first combination ratio, and displaying a mixed color on a screen, in which the determining of the first combination ratio includes identifying a first weight value corresponding to the transparency value of the first voxel by using a first weight function that is proportional to the transparency value, identifying a second weight value corresponding to a second transparency of a second voxel, by using a second weight function defined with an inflection point between a full transparency value and a full opacity value and increasing from the full transparency value to the inflection point and decreasing from the inflection point to the full opacity value, and determining the first combination ratio based on a ratio of the first weight value to the second weight value.

According to another aspect of the disclosure, an image display apparatus includes an overlapping detection unit configured to detect a plurality of voxels overlapping in a depth direction in three-dimensional (3D) image data, a combination ratio determination unit configured to determine a first combination ratio for two colors based on transparency values of a first voxel and a second voxel, a color determination unit configured to generate a first mixed color by combining a color of the first voxel with a color of the second voxel at the first combination ratio, and a display unit configured to display a mixed color on a screen, in which the combination ratio determination unit includes a first weight identification unit configured to identify a first weight value corresponding to the transparency value of the first voxel by using a first weight function that is proportional to the transparency value, a second weight identification unit configured to identify a second weight value corresponding to a second transparency of a second voxel, by using a second weight function defined with an inflection point between a full transparency value and a full opacity value and increasing from the full transparency value to the inflection point and decreasing from the inflection point to the full opacity value, and a combination ratio identification unit configured to identify the first combination ratio based on a ratio of the first weight value to the second weight value.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
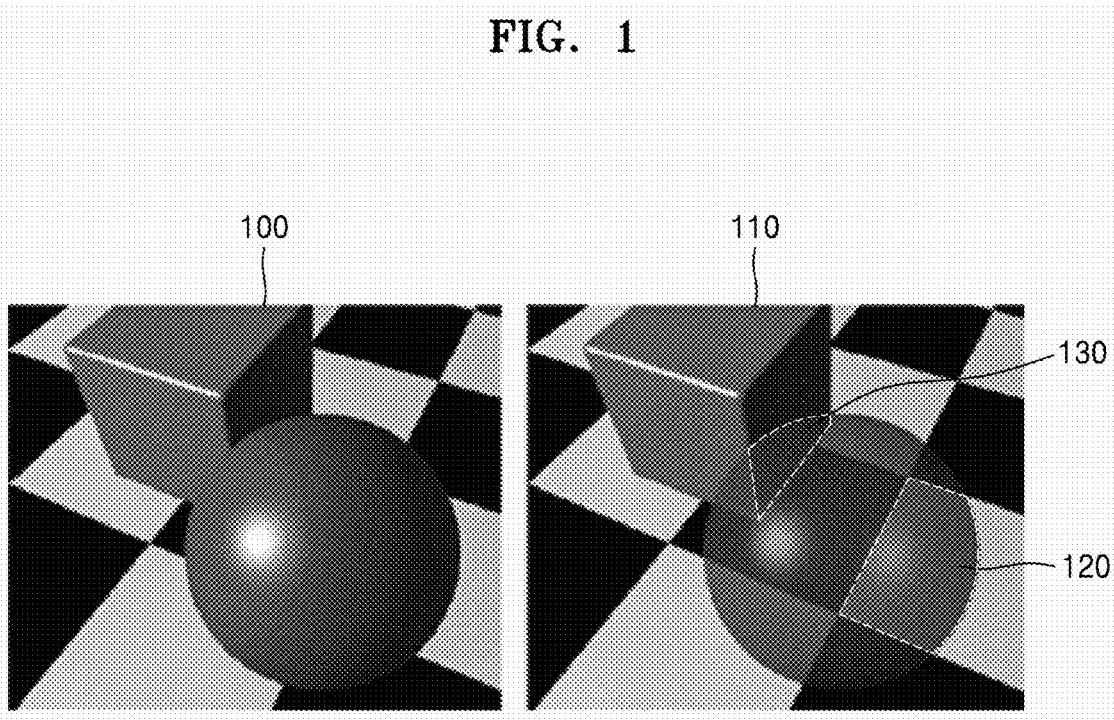
FIG. 1 illustrates an example of translucently displaying three-dimensional (3D) image data according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, a method and apparatus for displaying a translucent image according to an embodiment will be described in detail with reference to the accompanying drawings.

FIG. 1 illustrates an example of translucently displaying three-dimensional (3D) image data according to an embodiment.

Referring to FIG. 1, by adjusting a transparency of each object present in 3D image data, a user may observe an inside or a back part of the object. The current embodiment shows examples of a screen 100 on which opaque 3D image data is displayed and a screen 110 on which 3D image data is displayed in a translucent state by adjusting transmittances of some objects. For example, when a transmittance of a first object in a spherical shape is adjusted in 3D image data, a partial region 130 of a second object covered with the first object, a partial region 120 of a background, etc., may be seen in the translucent state.

According to an embodiment, transmittances of all objects of the 3D image data, except for the background, may be set to the translucent state or transmittances of some objects (e.g., the first object as in the current embodiment) may be set to the translucent state, and the second object may remain in an opaque state. For example, an image display apparatus may include a user interface capable of receiving a transparency value applied to all objects or each object of the 3D image data from a user. To set a transparency value for each object, conventional various object identification algorithms for identifying each object in the 3D image data may be applied to the current embodiment. In another example, the image display apparatus may adjust a transparency value for a specific region (set regardless of an object). That is, the image display apparatus may adjust a transparency value such that an inside of a specific region set by the user may be seen.

The image display apparatus may determine a color of a pixel to display 3D image data in a translucent state on a display device (e.g., a general monitor, a 3D display device (a head-up display, etc.,)), based on a transparency value of each object and a front-back relationship between objects. When colors of regions displayed to overlap in the translucent state are simply mixed and displayed according to transparency values, a front object or a back object may not be expressed well, or may not be seen well due to a lowered transparency of a mixed color. Thus, when colors of regions overlapping in the translucent state are mixed, they need to be mixed by applying different weight values thereto according to a front-back position relationship in a depth direction on a screen, and in this case, a process of finding an optimal weight value is required. A method of mixing colors of translucent regions with optimal weight values will be described in detail with reference to FIG. 2 below.

In the current embodiment, 3D image data may be data regarding a virtual object for virtual reality (VR) or augmented reality (AR) or data generated by photographing a real object with a depth camera, etc. Alternatively, the 3D image data may be a 3D medical image of computed tomography (CT) or magnetic resonance imaging (MRI). In addition, various types of 3D image data may be applied to the current embodiment and may not be limited to a specific example.

Hereinbelow, it may be assumed that a transparency value of each voxel of 3D image data is predefined. For example, it is assumed that a transparency value to be applied to all or some objects or a partial region of 3D image data is input from the user and is preset according to a conventional translucent image display method or the image display apparatus according to the current embodiment.

Figure 2:
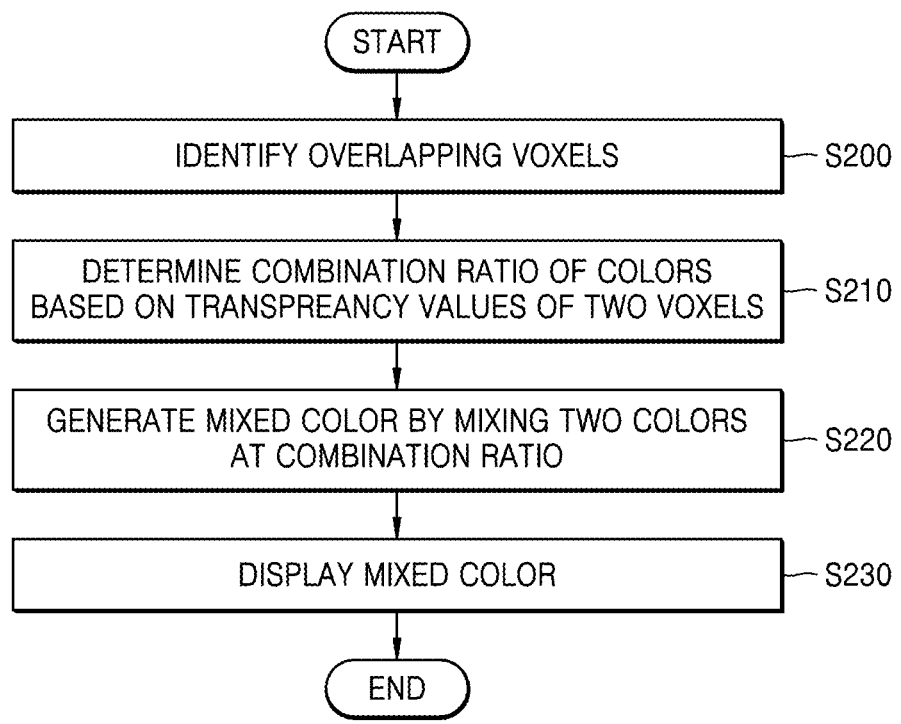
FIG. 2 is a flowchart showing an example of a method of displaying a translucent image according to an embodiment.

FIG. 2 is a flowchart showing an example of a method of displaying a translucent image according to an embodiment.

Referring to FIG. 2, an image display apparatus may detect voxels overlapping in a depth direction of a viewpoint of viewing a 3D image, in operation S200. Herein, a voxel may include a 3D position value and color information (e.g., a red/green/blue (RGB) value, a transparency value, etc.) of 3D image data. The image display apparatus may select two overlapping voxels.

The image display apparatus may determine a first combination ratio for two colors based on transparency values of a first voxel and a second voxel that overlap in a depth direction, in operation S210. More specifically, the image display apparatus may identify a first weight value corresponding to the transparency value of the first voxel by using a first weight function that is proportional to the transparency value. The image display apparatus may identify a second weight value corresponding to a second transparency value of the second voxel, by using a second weight function defined with an inflection point (e.g., a transparency value=0.5) between a full transparency value (e.g., a transparency value=0) and a full opacity value (e.g., a transparency value=1). The second weight function increases from the full transparency value to the inflection point and decreases from the inflection point to the full opacity value. The image display apparatus may determine the first combination ratio for color mixing based on a ratio of the first weight value to the second weight value. A method of determining a combination ratio using the first weight function and the second weight function will be described again with reference to FIG. 4.

The image display apparatus may generate a first mixed color by combining a color of the first voxel with a color of the second voxel at the first combination ratio, in operation S220. The image display apparatus may display the first mixed color on the screen in operation S230.

While the embodiment of FIG. 2 shows an example when colors of two voxels are mixed and displayed for convenience of description, there may be a plurality of objects in a depth direction when a 3D image is translucently displayed, and in this case, colors of three or more voxels may be mixed and displayed. When colors of three or more plural overlapping voxels are mixed, the method of FIG. 2 may be repeatedly performed and will be described again with reference to FIG. 6.

Figure 3:
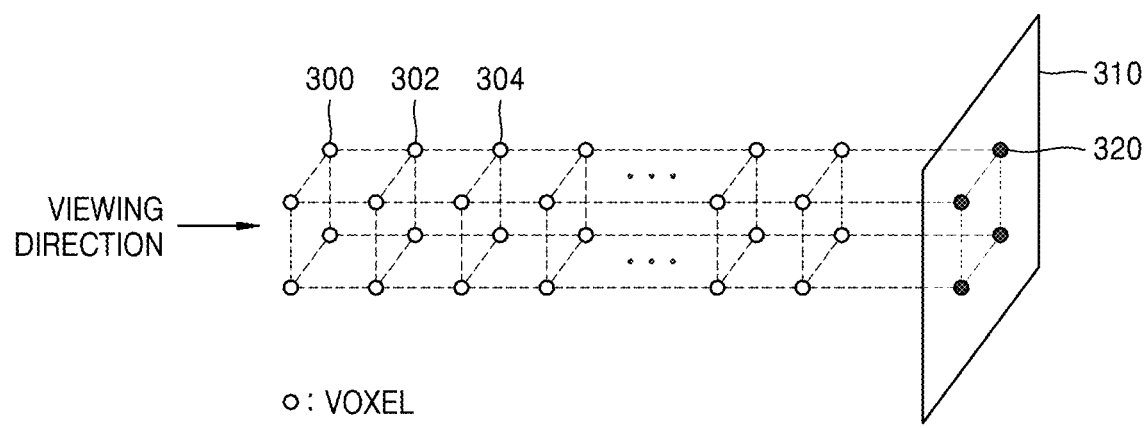
FIG. 3 illustrates an example of voxels overlapping in a depth direction in 3D image data according to an embodiment.

FIG. 3 illustrates an example of voxels overlapping in a depth direction in 3D image data according to an embodiment.

Referring to FIG. 3, 3D image data may include a plurality of voxels 300, 302, and 304 indicating respective positions of a space. Among voxels of the 3D image data, the plurality of voxels 300, 302, and 304 may overlap in a depth direction of a viewing direction (i.e., a viewpoint of a user or a camera).

The image display apparatus may generate a color of a pixel 320 of a screen 310 shown to the user by mixing the colors of the plurality of voxels 300, 302, and 304 overlapping in the depth direction. To mix the colors of the three or more voxels, a method of FIG. 6 may be used. For example, the image display apparatus may generate the first mixed color by mixing the colors of the first voxel 300 and the second voxel 302 according to the method of FIG. 2. The image display apparatus may generate a second mixed color by mixing the first mixed color with the color of the third voxel 304 according to the method of FIG. 2. That is, by replacing the color of the first voxel with the first mixed color in the example of FIG. 2 to apply the method of FIG. 2, a second mixed color may be generated. A transparency value of the first mixed color may be obtained using predefined various methods such as a weighted average of transparency values of two voxels, etc. Alternatively, the transparency value may be calculated using a method shown in FIG. 7.

In another embodiment, the image display apparatus may perform mixing on a voxel having a color without mixing all voxels. In 3D image data, a voxel indicating an empty space may exist. For example, the first voxel 300 may belong to a first object and have a first color, the third voxel 304 may belong to a second object and have a second color, but the second voxel 302 between the first voxel 300 and the third voxel 304 may indicate an empty space and have no color. In this case, the image display apparatus may perform color mixing between the first voxel 300 and the third voxel 304 except for the second voxel 302 having no color, by using the method of FIG. 2.

Figure 4:
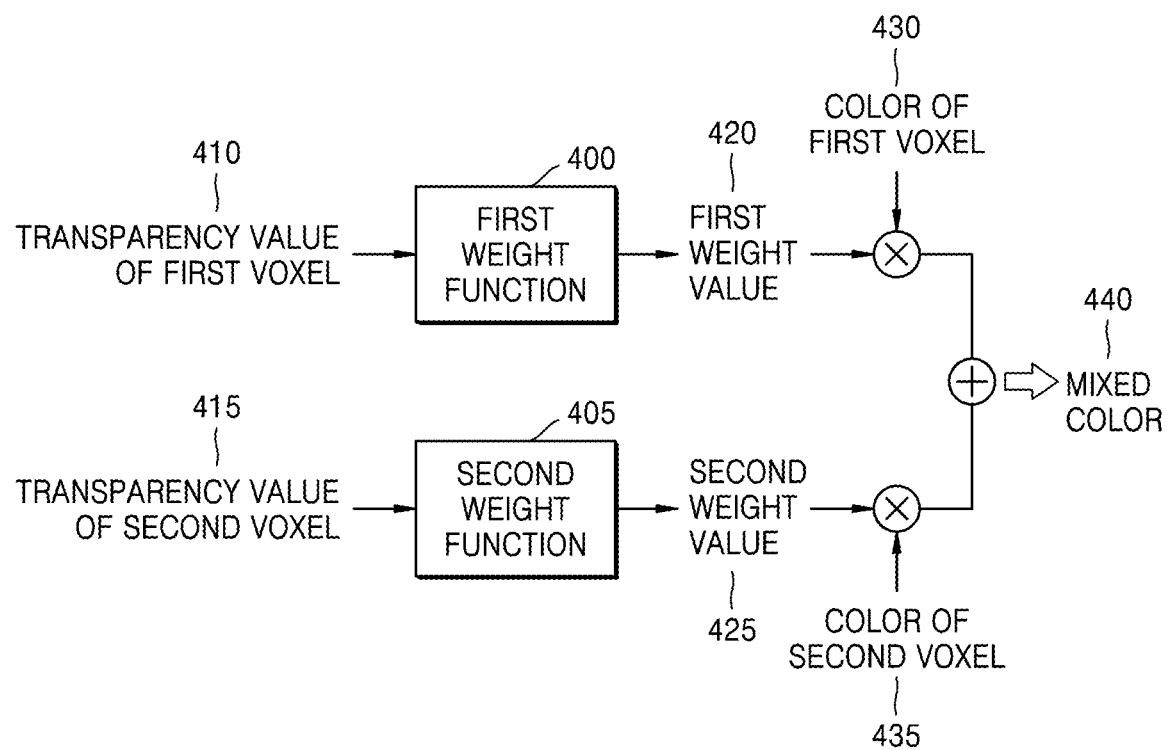
FIG. 4 illustrates an example of a method of determining a mixed color to translucently display 3D image data according to an embodiment.

FIG. 4 illustrates an example of a method of determining a mixed color to translucently display 3D image data according to an embodiment.

Referring to FIG. 4, the image display apparatus may include a first weight function 400 and a second weight function 405. The first weight function 400 may output a weight value proportional to a transparency value of a color. For example, the first weight function 400 may have a first-order proportional form (see FIG. 5).

The second weight function 405 may be defined with an inflection point predefined between a full transparency value and a full opacity value and increases from the full transparency value to the inflection point and decreases from the inflection point to the full opacity value. For example, when the transparency value ranges between 0 (full transparency) and 1 (full opacity), the inflection point may be an intermediate point corresponding to a transparency value=0.5. In addition, a position of the inflection point may be changed variously according to an embodiment.

The second weight function 405 may have a form of increasing from the full transparency value (i.e., 0) to the inflection point in various forms such as a linear or curved form, etc., and decreasing from the inflection point to the full opacity value (i.e., 1) in various forms such as a linear or curved form, etc. An example of the second weight function 405 is shown as graph in FIG. 5.

In an embodiment, a value of the first weight function 400 may be greater than a value of the second weight function 405 for the same transparency value. In other words, in the depth direction, a color reflection rate of a voxel located in front may be higher than that of a voxel located behind at all times, such that a front-back relationship between objects overlapping translucently may be indicated by a mixed color. In another embodiment, the second weight function 405 may have a symmetrical shape at both sides based on the inflection point.

The image display apparatus may input a transparency value 410 of a first voxel located in front in the depth direction to the first weight function 400 to identify a first weight value 420 and input a transparency value 415 of a second voxel located behind the first voxel in the depth direction to the second weight function 405 to identify a second weight value 425.

The image display apparatus may determine reflection rates of a color 430 of the first voxel and a color 435 of the second voxel by using a ratio of the first weight value 420 to the second weight value 425, thus generating a mixed color 440. For example, the image display apparatus may generate a mixed color using an Equation below.

$$\text{Mixed Color} = \frac{\text{First Weight Value} * \text{First Color Value} + \text{Second Weight Value} * \text{Second Color Value}}{\text{First Weight Value} + \text{Second Weight Value}} \quad \text{[Equation 1]}$$

A first color value may indicate a color value (i.e., an RGB value) of the first voxel, and a second color value may indicate a color value (i.e., an RGB value) of the second voxel.

Figure 5:
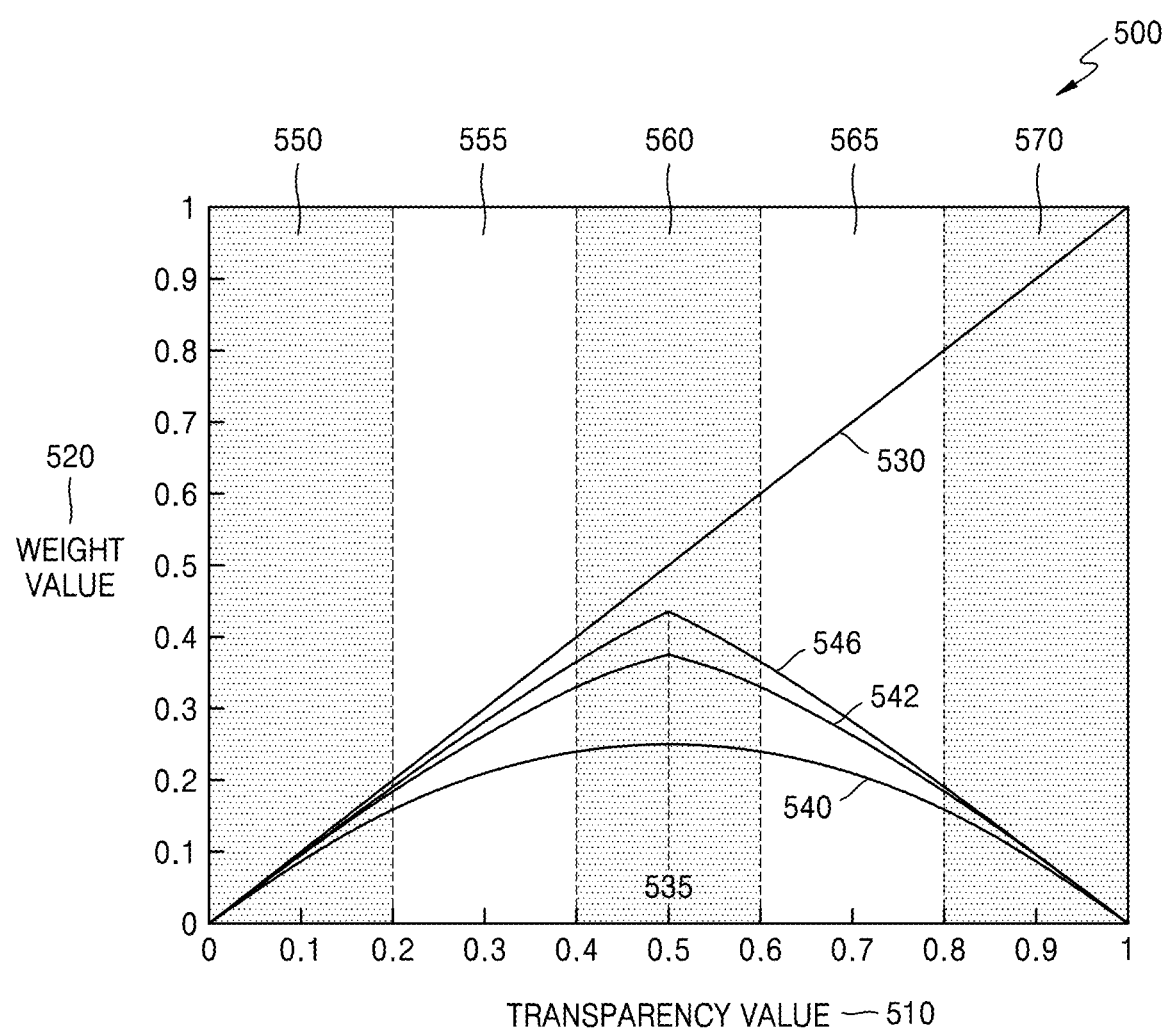
FIG. 5 is a graph of a weight function for color mixing according to an embodiment.

FIG. 5 is a graph of a weight function for color mixing according to an embodiment.

Referring to FIG. 5, a horizontal axis of a graph 500 may indicate a transparency value 510 and a vertical axis thereof may indicate a weight value 520. A first weight function 530 may be a linear function increasing proportionally to the transparency value 510. In the current embodiment, the first weight function 530 may be a first-order function where the transparency value 510 and the weight value 520 one-to-one correspond to each other, but this is merely an example and the first weight function 530 may be changed to functions in various forms where a transparency value and a weight value are proportional to each other.

Second weight functions 540, 542, and 546 may be functions which are symmetrical at both sides with respect to an inflection point 535 (e.g., a transparency value=0.5). Graphs of the second weight functions 540, 542, and 546 may be under a graph of the first weight function 530 at all times. The second weight functions 540, 542, and 546 may have a gap with the first weight function 530, which is gradually widened as the transparency value 510 increases to the inflection point 535, but is drastically widened after the inflection point 535.

The gap between the first weight function 530 and the second weight functions 540, 542, and 546 may change with magnitudes of values of the second weight functions 540, 542, and 546 at the inflection point 535. For example, when the second weight functions 540 and 546 having different values at the inflection point 535 are compared with each other, for a greater value at the inflection point 535, a change of the gap between the first weight function 530 and the second weight functions 540 and 545 is small up to the inflection point 535, but the change of the gap further increases after the inflection point 535. That is, the image display apparatus may drastically change a magnitude of a weight value difference with respect to the inflection point 535 when two colors are mixed, to express well overlapping objects in a translucent image, and at this time, by adjusting the magnitude of the value at the inflection point 535, a mixed color may be adjusted more precisely. However, the values of the second weight functions 540, 542, and 546 may be under the graph of the first weight function 530 at the inflection point 535 at all times. The second weight functions 540, 542, and 546 may be expressed in various equation forms.

In another embodiment, the image display apparatus may divide a section of a transparency value into a plurality of sections 550, 555, 560, 565, and 570 and then set a magnitude difference between a first weight value and a second weight value differently for each section. For example, the image display apparatus may determine the first weight value and the second weight value to be equal to each other or determine a difference therebetween according to a predefined a gap value within a predefined narrow range, in a first section 550 having a low transparency value, may define that the difference sharply changes with respect to the inflection point 535 in a third section 560 including the inflection point 535, and may define that the difference sharply changes in a fifth section 570 having a high transparency value. In addition, the first weight value and the second weight value may be defined in various ways in the respective sections 550, 555, 560, 565, and 570.

Figure 6:
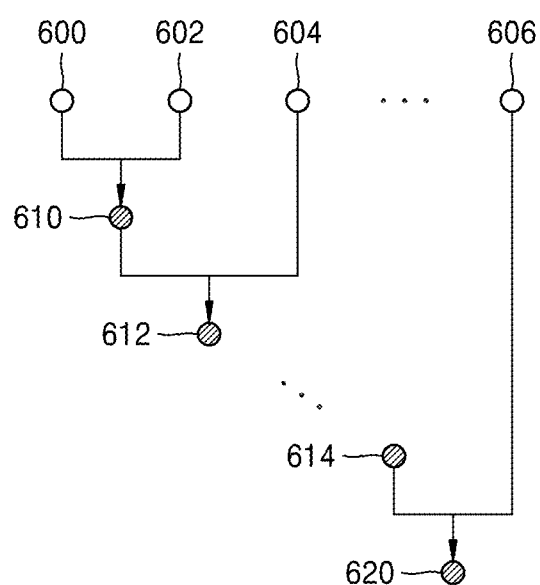
FIG. 6 illustrates an example of a method of mixing colors of a plurality of voxels according to an embodiment.

FIG. 6 illustrates an example of a method of mixing colors of a plurality of voxels according to an embodiment.

Referring to FIG. 6, the image display apparatus may sequentially mix colors of every two voxels overlapping in the depth direction to generate a final mixed color. For example, the image display apparatus may mix colors of a first voxel 600 and a second voxel 602 using the method of FIG. 2 to generate a first mixed color 610. Next, the image display apparatus may mix the first mixed color 610 with a color of a third voxel 604 using the method of FIG. 2 to generate a second mixed color 612. In this way, colors up to a color of the last voxel 606 are mixed to generate a final mixed color 620.

More specifically, the image display apparatus may determine an $(n+1)^{th}$ combination ratio according to a transparency value of an $n^{th}$ combined color (n is a natural number of 1 or greater) and a transparency value of an $(n+2)^{th}$ voxel, and combine the $n^{th}$ mixed color with the color of the $(n+2)^{th}$ voxel to generate an $(n+2)^{th}$ mixed color. The image display apparatus may determine the $(n+1)^{th}$ combination ratio and repeatedly perform a process of generating the $(n+2)^{th}$ mixed color up to the last voxel in the depth direction to generate a final mixed color. The final mixed color 620 may be a color of a pixel displayed on a two-dimensional (2D) plane the user actually sees in FIG. 3.

Figure 7:
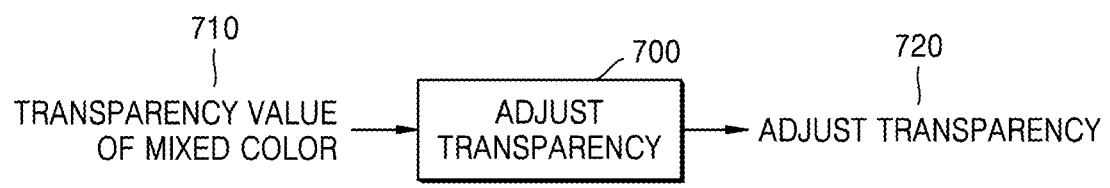
FIG. 7 illustrates an example of a method of adjusting a transparency of a mixed color according to an embodiment.

FIG. 7 illustrates an example of a method of adjusting a transparency of a mixed color according to an embodiment.

Referring to FIG. 7, the image display apparatus may include a transparency adjustment function 700 to adjust a transparency of a mixed color. As seen in FIG. 6, when colors of a plurality of voxels overlap, a transparency of a finally generated mixed color may be lowered and thus the mixed color may look dark. When a transparency of a mixed color is uniformly adjusted, some parts may be extremely bright and some parts may be extremely dark on a screen where several objects appear translucently, such that the entire image may look strange.

Figure 8:
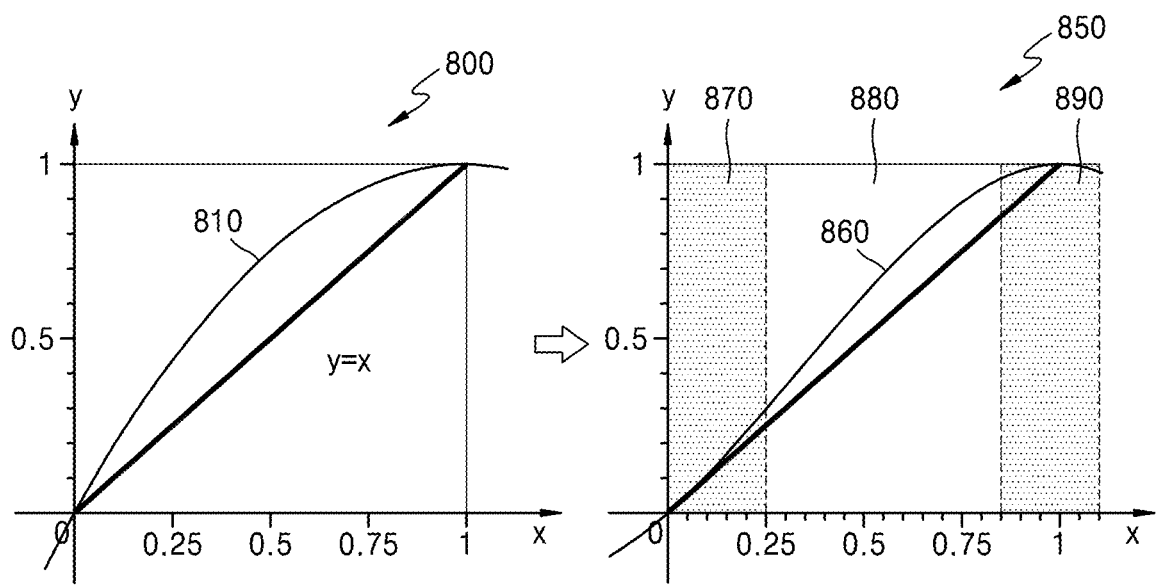
FIG. 8 is a graph for comparing mixed color transparencies before and after application of a transparency adjustment function according to an embodiment.

To improve the quality of a translucent image, the image display apparatus may adjust the transparency of the mixed color by using the transparency adjustment function 700. For example, the transparency adjustment function 700 may be a function that defines a reduction rate that is inversely proportional to a magnitude of a transparency value. For example, the transparency adjustment function 700 may increase a reduction rate in a section having a low transparency value as shown in FIG. 8, thereby preventing several objects having low transparency values from being displayed dark when overlapping translucently.

A transparency of a mixed color generated by mixing a first color having a first transparency value with a second color having a second transparency value may be calculated in various ways such as an average value of two transparency values, etc. For example, a transparency value of a mixed color may be calculated using an equation below. In addition, a method of calculating a transparency value of a mixed color may be defined in advance in various forms.

$$\text{Mixed Color Transparency Value} = a_1 + (1-a_1)*a_2 \qquad \text{[Equation 2]}$$

$a_1$ may indicate a transparency value of the first color, and $a_2$ may indicate a transparency value of the second color.

When two colors having the same transparency value are mixed, an example of a change in a transparency value of a mixed color is shown in FIG. 8 where a transmittance of the mixed color is calculated using a method of Equation 2. When two colors having low transparency values are mixed, a transparency value of a mixed color is greater than a transparency value of the original color, and especially when two colors having low transparency values are mixed, they may look darker.

Thus, the image display apparatus may obtain a reduction rate for reducing a transparency value of a mixed color by using the transparency adjustment function 700. The transparency adjustment function 700 may have various forms such as a form of a first-order function or an $n^{th}$-order (n=2 or greater) function, etc., that decreases according to a magnitude of a transparency value. For example, when the transparency value of the mixed color is calculated using the method of Equation 2, the transparency adjustment function may be expressed as below in combination with Equation 2.

$$\text{Adjustment Transparency Value} = \text{Max}(a_1,a_2) + (1-(\max(a_1,a_2))*(\min(a_1,a_2)) \qquad \text{[Equation 3]}$$

$a_1$ and $a_2$ may indicate transparency values of two voxels.

A reduction rate of the transparency adjustment function 700 may be determined as min $(a_1, a_2)$ k. In other words, the transparency adjustment function 700 may reduce the transparency value of the mixed color by applying an inversely proportional reduction rate with respect to the less value between the transparency values of the two colors in Equation 2 that obtains the transparency value of the mixed color. The reduction rate may be set variously by adjusting a variable k.

FIG. 8 is a graph for comparing mixed color transparencies before and after application of a transparency adjustment function according to an embodiment.

Referring to FIG. 8, a left graph 800 may be a graph showing a result of calculating a transparency value 810 of a mixed color using Equation 2 when two colors having the same transparency value are mixed, and a right graph 850 may be a graph showing a result of calculating a transparency value 860 of the mixed color by applying a transparency adjustment function of Equation 3. An x axis may indicate transparency values of two colors, and a y axis may indicate a transparency value of a mixed color.

As the transparency values of the two colors mixed with each other decrease (i.e., transmittances increase), a change rate between the original transparency values of the two colors and the transparency value of the mixed color may be great. As a result, a mixed color of a region displayed translucently may suddenly look darker than surroundings of the region.

The image display apparatus may adjust the transparency value of the mixed color with the transparency adjustment function that defines the reduction rate being inversely proportional to the magnitude of the transparency value of the mixed color. When the transparency value of the mixed color is calculated using Equation 2, the image display apparatus may define the transparency adjustment function in the form of Equation 3 through combination with Equation 2.

In another embodiment, the image display apparatus may set a plurality of sections 870, 880, and 890 based on a transparency value and use a transparency adjustment function that defines a reduction rate for each section. For example, the image display apparatus may largely lower a magnitude of a transparency value by applying a high reduction rate proportional to the transparency value of the mixed color to a first section 870 having a low transparency value, maintain an existing transparency value for a third section 890 having a high transparency value, and apply a lower reduction rate to a second section 880 than to the first section 870.

Figure 9:
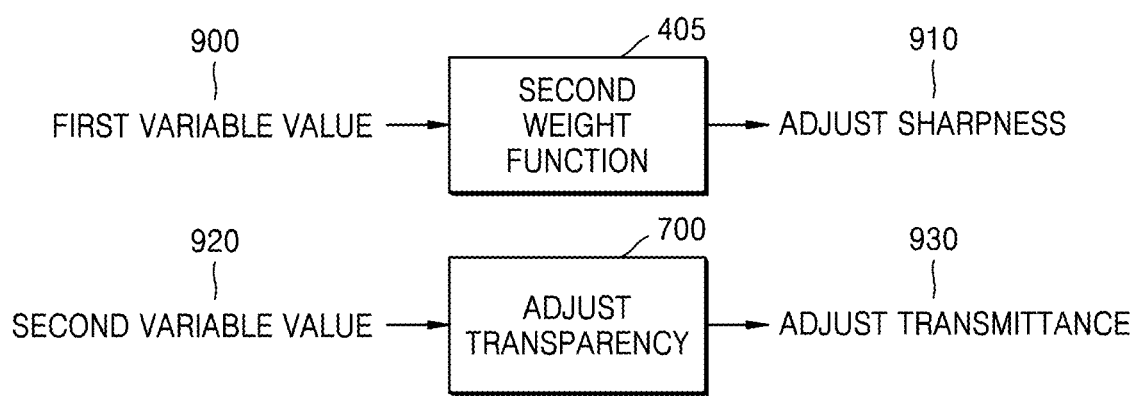
FIG. 9 illustrates an example of a method of adjusting a sharpness and a transmittance of a translucent image according to an embodiment.

FIG. 9 illustrates an example of a method of adjusting a sharpness and a transmittance of a translucent image according to an embodiment.

Referring to FIG. 9, the image display apparatus may adjust variable values 900 and 920 of the second weight function 405 or the transparency adjustment function 700 to more precisely control a transparency 910 or a transmittance 930, etc., of a translucent region where several objects are displayed overlappingly.

As shown in FIG. 5, the second weight function 405 may variously change a gap between a first weight function and a second weight function 405 by adjusting a magnitude of a value of the second weight function 405. The second weight function may include a first variable capable of adjusting a magnitude of the inflection point 535 (i.e., a value of the second weight function 405). For example, the image display apparatus may receive the first variable value 900 from the user through a user interface to change a second weight value for color mixing, thus increasing a sharpness 910 of several objects of a translucent region displayed on the screen.

The transparency adjustment function 700, which is a function defining a reduction rate that is inversely proportional to a magnitude of a transparency value, may include a second variable capable of variously setting the reduction rate. For example, when the transparency adjustment function 700 has the form of Equation 3, the second variable may be k. The image display apparatus may receive the second variable value 920 from the user through the user interface to optimally change a transmittance of a mixed color.

Figure 10:
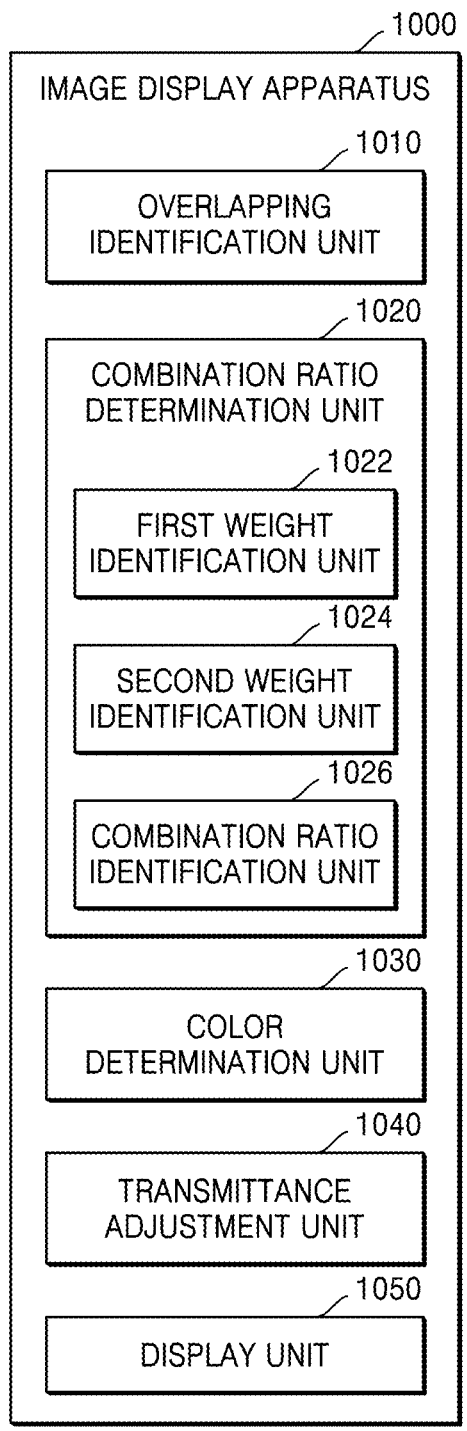
FIG. 10 is a diagram showing a structure of an example of an image display apparatus according to an embodiment.

FIG. 10 is a diagram showing a structure of an example of an image display apparatus according to an embodiment.

Referring to FIG. 10, an image display apparatus 1000 may include an overlapping detection unit 1010, a combination ratio determination unit 1020, a color determination unit 1030, a transmittance adjustment unit 1040, and a display unit 1050. The combination ratio determination unit 1020 may include a first weight identification unit 1022, a second weight identification unit 1024, and a combination ratio identification unit 1026. The image display apparatus may be implemented as a computing device including a memory, a processor, an input/output device, etc. In this case, each configuration may be implemented with software and mounted on a memory, and then may be executed by a processor.

The overlapping detection unit may detect a plurality of voxels overlapping in the depth direction in 3D image data. An example of the plurality of overlapping voxels is shown in FIG. 3.

The composition ratio identification unit may determine a first combination ratio for two colors based on transparency values of a first voxel and a second voxel. More specifically, the composition ratio identification unit may include a first weight identification unit, a second weight identification unit, and a combination ratio identification unit. The first weight identification unit may identify a first weight value corresponding to the transparency value of the first voxel by using a first weight function that is proportional to the transparency value. The second weight identification unit may identify a second weight value corresponding to a second transparency of a second voxel, by using a second weight function defined with an inflection point between a full transparency value and a full opacity value and increasing from the full transparency value to the inflection point and decreasing from the inflection point to the full opacity value. The combination ratio identification unit may determine a first combination ratio based on the ratio of the first weight value to the second weight value. Examples of the first weight function and the second weight function are shown in FIG. 5.

The color determination unit may generate a first mixed color by combining a color of the first voxel with a color of the second voxel at the first combination ratio. An example of a method of determining the mixed color by using the first weight value and the second weight value is shown in FIG. 4.

The transparency adjustment unit may adjust the transparency value of the first mixed color by using the transparency adjustment function indicating a reduction rate inversely proportional to a magnitude of a transparency value. An example of adjusting the transparency of the mixed color by using the transparency adjustment function is shown in FIGS. 7 and 8.

The display unit may display the mixed color on the screen. For example, the display unit may display a screen including a final mixed color generated by combining colors of a plurality of voxels as shown in FIG. 6.

Figure 11:
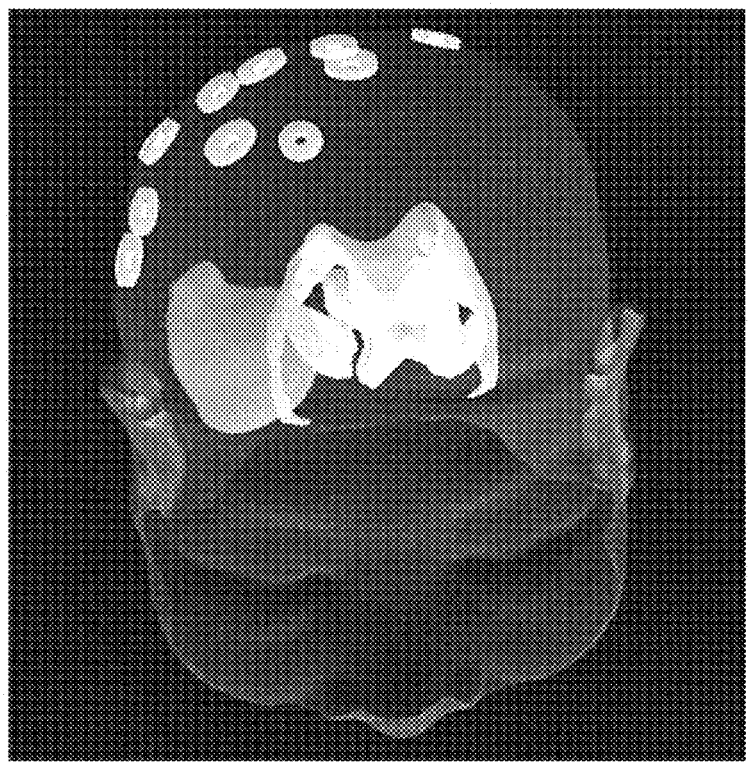
FIG. 11 shows an example in which a method of displaying a translucent image according to an embodiment is applied to a 3D medical image.

FIG. 11 shows an example in which a method of displaying a translucent image according to an embodiment is applied to a 3D medical image.

Referring to FIG. 11, the image display apparatus may translucently display each object of a 3D medical image by applying a method according to the current embodiment. For example, the image display apparatus may display each object (e.g., various human body tissues, etc.) included in the 3D medical image in different colors. The image display apparatus may mix different colors of respective objects to translucently display the objects.

The disclosure may also be implemented as a computer-readable program code on a computer-readable recording medium. The computer-readable recording medium may include all types of recording devices in which data that is readable by a computer system is stored. Examples of the computer-readable recording medium may include read-only memory (ROM), random access memory (RAM), compact-disc ROM (CD-ROM), a magnetic tape, a floppy disk, an optical data storage device, etc. The computer-readable recording medium may be distributed over computer systems connected through a network to store and execute a computer-readable code in a distributed manner.

So far, embodiments have been described for the disclosure. It would be understood by those of ordinary skill in the art that the disclosure may be implemented in a modified form within a scope without departing from the essential characteristics of the disclosure. Therefore, the disclosed embodiments should be considered in a descriptive sense rather than a restrictive sense. The scope of the present specification is not described above, but in the claims, and all the differences in a range equivalent thereto should be interpreted as being included in the disclosure.

According to an embodiment, when objects of a 3D image are displayed to overlap translucently, an optimal mixed color may be identified in which all overlapping objects are visible well. In another example, when a plurality of objects are displayed to overlap translucently, a transparency may be adjusted optimally.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An image display method, performed by a computing device comprising a memory and a processor, the method comprising:
   detecting a plurality of voxels overlapping in a depth direction in three-dimensional (3D) image data which is displayed on a general monitor or a 3D display device, wherein the 3D image data is a medical image of computed tomography (CT) or magnetic resonance imaging (MRI), wherein the 3D image data have voxels of a plurality of objects with different colors;
   determining a first combination ratio for two colors based on transparency values of a first voxel and a second voxel of the plurality of voxels, wherein the first voxel belongs to a first object and the second voxel belongs to a second object;
   generating a first mixed color by combining a color of the first voxel with a color of the second voxel at the first combination ratio; and
   displaying the first mixed color at a position corresponding to the first voxel and the second voxel on the general monitor or the 3D display device,
   wherein the determining of the first combination ratio comprises:
   identifying a first weight value corresponding to the transparency value of the first voxel by using a first weight function that is proportional to the transparency value;
   identifying a second weight value corresponding to a second transparency of a second voxel, by using a second weight function defined with an inflection point between a full transparency value and a full opacity value and increasing from the full transparency value to the inflection point and decreasing from the inflection point to the full opacity value; and
   determining the first combination ratio based on a ratio of the first weight value to the second weight value.

2. The image display method of claim 1, wherein a value of the first weight function is greater than a value of the second weight function for a same transparency value, and the second weight function is symmetrical at both sides with respect to the inflection point.

3. The image display apparatus of claim 1, wherein the identifying of the second weight value comprises receiving a value of a variable that adjusts a magnitude of a value of the second weight function with respect to the inflection point, and a second weight value output from the second weight function for the same transparency value differs with the value of the variable.

4. The image display method of claim 1, further comprising adjusting a transparency value of the first mixed color by using a transparency adjustment function indicating a reduction rate inversely proportional to a magnitude of a transparency value.

5. The image display method of claim 4, wherein the adjusting of the transparency value comprises reducing the transparency value of the first mixed color at a reduction rate obtained by inputting a smaller value between the transparency value of the first voxel and the transparency value of the second voxel to the transparency adjustment function.

6. The image display method of claim 1, wherein the determining of the first combination ratio comprises determining an $(n+1)^{th}$ combination ratio according to a transparency value of an $n^{th}$ mixed color (n is a natural number of 1 or greater) and a transparency value of an $(n+2)^{th}$ voxel, and
   the generating of the mixed color comprises generating an $(n+2)^{th}$ mixed color by combining the $n^{th}$ mixed color with a color of the $(n+2)^{th}$ voxel at the $(n+1)^{th}$ combination ratio, and
   the determining of the $(n+1)^{th}$ combination ratio and the generating of the $(n+2)^{th}$ mixed color are repeatedly performed up to a last voxel in the depth direction.

7. The image display method of claim 1, wherein the 3D image data comprises data of a combined image of a real image captured in real time by a camera and a virtual image for a virtual object, which overlaps the real image.

8. A computer-readable recording medium having recorded thereon a computer program for executing the image display method of claim 1.

9. An image display apparatus comprising:
   a processor, configured to:
   detect a plurality of voxels overlapping in a depth direction in three-dimensional (3D) image data which is displayed on a general monitor or a 3D display device, wherein the 3D image data is a medical image of computed tomography (CT) or magnetic resonance imaging (MRI), wherein the 3D image data have voxels of a plurality of objects with different colors;
   determine a first combination ratio for two colors based on transparency values of a first voxel and a second voxel of the plurality of voxels, wherein the first voxel belongs to a first object and the second voxel belongs to a second objects;
   generate a first mixed color by combining a color of the first voxel with a color of the second voxel at the first combination ratio; and
   display the first mixed color at a position corresponding to the first voxel and the second voxel on the general monitor or the 3D display device,
   wherein the processor is configured to identify a first weight value corresponding to the transparency value of the first voxel by using a first weight function that is proportional to the transparency value,
   wherein the processor is configured to identify a second weight value corresponding to a second transparency of a second voxel, by using a second weight function defined with an inflection point between a full transparency value and a full opacity value and increasing from the full transparency value to the inflection point and decreasing from the inflection point to the full opacity value, and wherein the processor is configured to identify the first combination ratio based on a ratio of the first weight value to the second weight value.

10. The image display apparatus of claim 9, wherein the processor is further configured to adjust a transparency value of the first mixed color by using a transparency adjustment function indicating a reduction rate inversely proportional to a magnitude of a transparency value.

* * * * *